April 22, 1969 R. A. KERNS 3,440,086
POLYURETHANE PRECURSOR-VISCOSITY BUILDER AND CURING AGENT
COATING COMPOSITION AND METHOD OF COATING THEREWITH
Filed Dec. 23, 1964
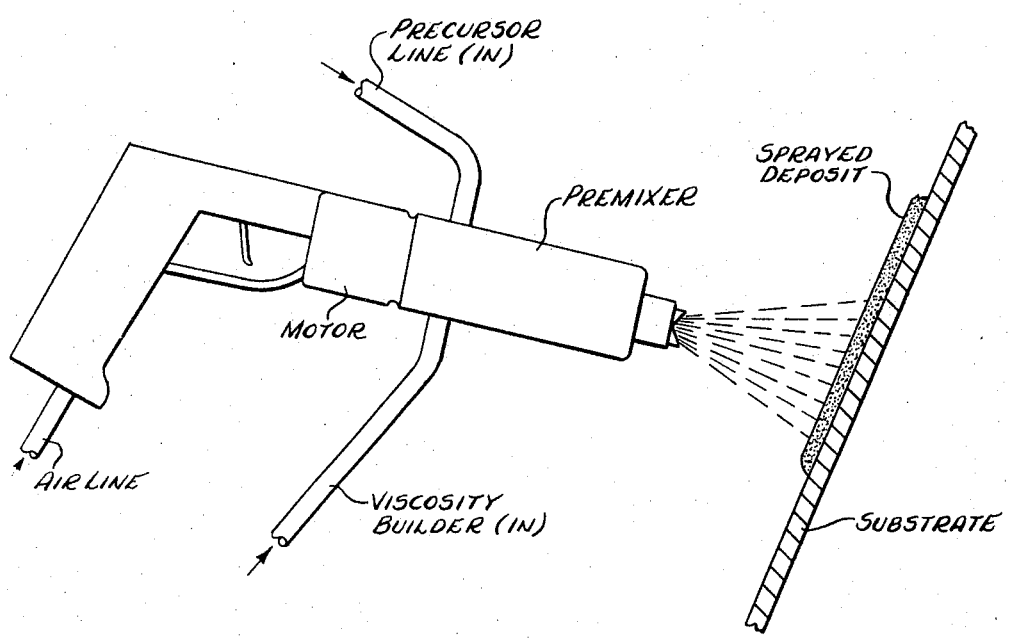

3,440,086
POLYURETHANE PRECUSOR-VISCOSITY BUILD-
ER AND CURING AGENT COATING COMPOSI-
TION AND METHOD OF COATING THEREWITH
Richard A. Kerns, La Crescenta, Calif., assignor to The
Firestone Tire & Rubber Company, Akron, Ohio, a cor-
poration of Ohio
Filed Dec. 23, 1964, Ser. No. 420,607
Int. Cl. B05b 7/26; C23c 7/00; C09d 3/12
U.S. Cl. 117—105.5                5 Claims

ABSTRACT OF THE DISCLOSURE

A viscosity builder is used with polyurethane to be sprayed on to the slanting surface or the undersurface of a substrate. The polyurethane precursor and diisocyanate curing agent for the viscosity builder are introduced into the spray nozzle through one feed line, together with some of the viscosity builder, if desired; and polyamine or polyol curing agent for the precursor together with the balance of the viscosity builder, or all of it, are introduced to the spray nozzle through a separate feed line. As they are sprayed simultaneously on to the substrate, they set up almost instantaneously.

This invention relates to polyurethanes. It includes a viscous liquid curing agent-and-visosity-builder composition designed for spraying jointly with a polyurethane precursor to produce a high-solids, viscous deposit which sets up before any substantial change occurs in the physical structure of the deposit. The invention includes the procedure of jointly spraying the precursor with the curing agent and viscosity builder.

The joint spraying of a polyurethane precursor and curing agent through a single-nozzle, pre-mixer spray gun is known. It has been proposed, for example, in Devolopment Products Report No. 10 (dated Mar. 15, 1958) of the Elastomer Chemicals Department of E. I. du Pont de Nemours and Company, entitled Adiprene L: a Liquid Urethane Elastomer. The compositions sprayed with the polyurethane precursor, as there described, have low viscosity, consequently the sprayed mixtures can be build up in a single pass to only thin layers which are, for example, only 1.0 to 1.5 mils thick. When thicker layers are deposited they change their physical structure before gelling or curing, by sagging or running, etc.

According to this invention, there is mixed with a polyurethane precursor, a polyamine or polyol to cure the precursor, the viscosity builder which chemically or by its physical presence builds up the viscosity of the deposit, and a fast curing agent (a diisocyanate) for the viscosity builder. The precursor and the diisocyanate curing agent for the viscosity builder together with part of the viscosity builder, if desired, are supplied to a pre-mixer in the spray device through one conduit. The curing agent for the precursor, either alone or mixed with the balance of the viscosity builder are supplied to the pre-mixer through a different conduit. After mixing these are sprayed through a nozzle, almost immediately, on to the desired substrate and a non-sagging deposit of desired thickness is formed. The deposit formed in a single pass of the nozzle may be relatively thin or it may be as thick as $\frac{1}{10}$ inch or thicker.

Curing agent and viscosity builder

The curing-agent component of this invention contains a viscosity builder and together with the precursor they form a deposit which is so viscous and quick-acting that by pre-mixing and spraying onto a substrate which is positioned at an angle of 45° to 135° or even on to the underside of a horizontal surface, a layer of the mixture .01 to 0.1 inch thick can be built up which usually sets within 10 to 30 seconds, although sets as long as 10 minutes are possible. The deposit gels before any substantial structural change, such as sagging, occurs in the deposit.

The thickness of the film deposited does not change appreciably except for the change entailed in the process of leveling. Air trapped in the spray produces minute, closed-cell porosity. The size of the cells, generally, does not change in the deposit. There is little or no coalescence to form pits. It is conceivable that if a diisocyanate is used, some porosity is due to carbon dioxide released by the action of the diisocyanate and moisture in the ambient air. The thickness of the film deposited depends upon the composition of the spray solution, dexterity of the spray-gun operator and the rate of gellation of the deposit. Obviously, with slow-gelling, low-viscosity compositions, the thickness of the deposit will be governed by the slope of the substrate.

Many materials are available for use as viscosity builders. They are generally used singly, but mixtures may be used. They are compatible with the precursor and may cross link therewith. The amount required will depend upon the viscosity of the polyurethane precursor with which it is to be used, the nature and amount of the solvent employed, the thickness of the layer that is to be built up, the speed of the curing agent in setting up the polyurethane, the slope of the substrate, etc. They must be used in an amount sufficient to effect the desired viscosity in the sprayed deposit. Various of the materials that may be used as viscosity builders, with a preferred percentage content (in parts by weight per 100 parts of polyurethane precursor), are listed below:

| Material | Parts |
|---|---|
| Soluble thermoplastic polyurethane [a] | 0–10 |
| Phenoxy resin [b] | 0–20 |
| Polyvinyl alcohol | 2–10 |
| Polyvinyl butyral | 2–10 |
| Methoxymethylated nylon [c] | More than 10 |
| Polymethylene polyphenol | 2–10 |
| Epoxy novolaks | 3–10 |
| Allyl ether of di- and trimethylol ethers | 4–14 |
| Methyl cellulose | More than 2 |
| Melamine formaldehydehyde | More than 5 |
| Urea formaldehyde | More than 5 |

[a] This is a linear polyester urethane which is soluble in the solvent employed for the curing-agent and the viscosity builder composition. Linear polyester urethanes must be sufficiently soluble in some solvent at room temperature to function as a viscosity builder. A high viscosity fluid or high plasticity solid produces films with less tendency to sag than low viscosity or plasticity materials at constant solids content. This is desirable when spraying inclined surfaces. The linear polyester urethane should be resistant to the chemicals to which the sprayed surface is to be exposed.
[b] A recommended phenoxy resin is a thermoplastic copolymer of Bisphenol A and epichlorhydrin. This has ability to cross link with the precursor for improved chemical resistance and to build viscosity in the sprayed deposit.
[c] A commercial product which has about 0.316% nitrogen in the parent polymer (Type 6 nylon). It is substituted by methoxy-methyl groups. (13.2% by weight.) Substitution is random.

The precursor may be a polyether or polyester. Where moisture resistance is required, polyether urethanes are used. There are various such materials available on the market that may be used and their compositions and properties are well known: several are listed here with their free isocyanate contents:

| | Free isocyanate, percent |
|---|---|
| Adiprene L–100 | 4.0–4.3 |
| Adiprene L–167 | 6.1–6.6 |
| Adiprene L–315 | 9.0–9.5 |
| Multrathane F–196 | 4.7–5.2 |
| Polycin V–53 | 10.6+ |
| Polycin V–63 | 14.6+ |

Others include Cyanaprene 4590, Vibrathane 6001, etc.

Various well known curing agents for the polyurethane precursor, either polyamines or polyols, may be used. A mixture of such curing agents may be employed. For a slanted or inverted surface, quicker curing is required than for the top of a horizontal surface. Curing agents include those listed in the following table, where the amount of each per 100 parts of polyurethane precursor recommended to give the desired rapid cure is given:

| Material | Parts per 100 polyurethane precursor |
|---|---|
| 4,4′-methylene-bis-o-(2-chloroaniline) | 6–15 |
| Diaminodiphenylamine | 6–10 |
| Metaphenylenediamine | 3–5 |
| Diaminopyridine | 3–5 |
| Triethylene tetramine | 2–3 |
| Hexamethylenediamine | 4–6 |
| 4,4′-diaminobenzophenone | 7–9 |
| Linear condensation polymer of polymerized lineoleic acid and a polyamine [1] | 20–25 |
| N,N′-(2-amino ethyl)oxydibenzylamine | 8–14 |
| Ortho dianisidine | 5–14 |
| Ortho tolidine | 4–12 |
| N,N,N′,N′-tetrakis(2-hydroxypropyl) ethylenediamine | 6–8 |
| Triethanolamine [2] | 0.2–0.5 |
| Methyldiethanolamine [2] | 4–6 |
| Triethanolamine | 4–6 |
| Trimethanolpropane [2] | 0.5–1.5 |
| 1,4-butanediol [2] | 3–5 |
| 2,4-pentanediol | 4–7 |
| 3,3′-dichlorobenzidine | 6–14 |
| 1,2,6-hexanetriol | 2–6 |
| Trimethylol ethane | 1–2 |
| 2-butene-1,4-diol | 3–5 |

[1] U.S. Patent 2,379,413.
[2] Used together.

Other curing agents include diaminodiphenylsulfone, cumenediamine, hexamethylenetetramine and 1,2,6-hexatriol. A preferred spray composition consists of a solvent mixture of the precursor and MOCA a trade name for 4,4′-methylene-bis-o-(2-chloroaniline) with a phenoxy resin and a solid polyurethane polymer and isocyanate to cross link the MOCA resin and polymer.

The curing and gel rates of these various agents vary. Faster gelling will be required for thicker deposits of the spray material, and also for less viscous deposits. A gel time of less than 30 seconds is preferred. The viscosity of the deposit of polyurethane precursor and its curing agent and the viscosity builder and its curing agent at the time of the deposit, or soon thereafter, depends upon their compositions and the gelling rate or set time of the deposit. The rates of cure of the different curing agents vary widely, and the curing agent or mixture of curing agents employed will be selected with this in mind.

Typical raw materials for the precursors include:

| Material | Avg. mol. wt. |
|---|---|
| Polyethylene glycols | 200–800 |
| Polypropylene glycols | 400–4000 |
| Polybutylene glycols | 500–2000 |
| Polyepichlorhydrin | 400–1200 |
| Ethylene and propylene oxide copolymers | 2000–3000 |
| Polytetrahydrofuran | 2000–3000 |
| Ethylene and propylene oxide copolymer 10% black ethylene oxide | 1500–2000 |

Typical diisocyanates used in producing the precursor include:

Hexamethylene diisocyanate
2,4-toluene diisocyanate
Diphenyl methane diisocyanate The solvent used is important, and the amount will determine to what thickness a sprayed deposit can be built up in a single pass and retain its structural stability. The solvent must be sufficiently volatile to vaporize during the set or cure of the deposit. However, it must not be so volatile as to be substantially absent from the sprayed film, thus eliminating flowing and leveling of the sprayed film. The solvent must be hydroxyl free and otherwise inert. The amount of solvent will depend upon the viscosity required. The composition of the polyurethane precursor, its curing agent, the viscosity builder and its curing agent, as deposited on the substrate, will not flow and if deposited on the under side of a substrate, will not sag. The amount of solvent may vary, depending upon the viscosity of the polyurethane precursor, etc. The solvents which can be used include:

| | |
|---|---|
| ethyl acetate | mesityl oxide |
| n-propyl acetate | ethylbutyl ketone |
| sec-butyl acetate | methyl n-propyl ketone |
| methylethyl ketone | benzene |
| pentoxone | toluene |
| methylisobutyl ketone | xylene |
| diisobutyl ketone | |

Ethyl acetate is a preferred solvent for keeping the precursor in solution over a long period of time with no change in viscosity.

Several representative formulae of suitable curing-agent and viscosity-builder compositions follow. Each is intended for use with 100 parts of polyurethane precursor.

CURING AGENT AND VISCOSITY-BUILDER FORMULAE

| | A | B | C | D | E |
|---|---|---|---|---|---|
| Curing agent: | | | | | |
| MOCA [1] | 14.3 | | | | |
| N,N'-(2-aminoethyl) oxydibenzylamine | | 14 | | 14 | 14 |
| Trimethanol propane | | | 1.5 | | |
| 1,4-butanediol | | | 5 | | |
| Viscosity builder: | | | | | |
| Soluble thermoplastic polyurethane | 1.02 | 2 | 2 | 2 | 2 |
| Thermoplastic copolymer of bisphenol A and epichlorhydrin [2] | 4.50 | 5 | 5 | | |
| Epoxy Novolak [3] | | | | 8 | |
| Methoxy methylated nylon | | | | | 5 |
| Curing agent for above viscosity builder: | | | | | |
| Dianisidine diisocyanate | 0.37 | | | | |
| Diphenylmethane diisocyanate | | 1 | 1 | 1 | 1 |
| Solvents: | | | | | |
| Ethyl acetate | 5.7 | 10 | 10 | 10 | 10 |
| Methylethyl ketone | 13.20 | | | | |
| Methylisobutyl ketone | 2.69 | | | | |
| Mesityl oxide | | 10 | 10 | 10 | 5 |
| Toluene | | 5 | 5 | 5 | |
| Ethylene dichloride | | | | | 50 |

[1] MOCA is 4,4'-methylene-bis-o-(2-chloroaniline).
[2] A polyhydroxy ether with approximate mol. wt. of 30,000 made from Bisphenol A and epichlorhydrin.
[3]

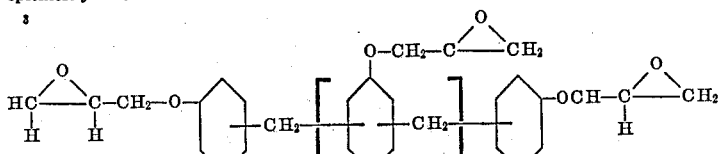

with an epoxide equivalent of 170-182, viscosity at 100 F. of 10,000 to over 100,000 CPS.

A suitable "soluble thermoplastic polyurethane" is diphenylmethane-p,p'-diisocyanate-adipic acid-butane diol-1,4 polymer having an average molecular weight of 3600. Other diols may be substituted such as pentane diol-2,4, 2-ethylhexane diol-1,3, triethylene glycol yielding a molecular weight spread of 3500 to 4500. The diisocyanates of the above formula cross link this polyurethane and improve its chemical resistance. Other diisocyanates that may be used include methylene diisocyanate, toluene diisocyanate, polymethylene polyphenylisocyanate, etc.

The amount of (1) the curing agent for the polyurethane precursor and (2) the viscosity builder of the above formula may be varied to include 4 to 15 parts (based on 100 parts of polyurethane precursor) of a polyamine or polyol and 2 to 20 parts of polymeric viscosity builder. This viscosity builder may include 2 to 10 parts of a soluble thermoplastic polyurethane in which case 0.2 to 5 parts of a diisocyanate is used to cure it. A higher percentage of viscosity builder can be used to produce a more or less stiff sprayed product.

Other exempletive formulae for a suitable curing agent and viscosity-builder composition follow, the amounts being parts by weight, per 100 parts of polyurethane:

CURING AGENT AND VISCOSITY-BUILDER FORMULAE

| | F | G | H | I | J | K |
|---|---|---|---|---|---|---|
| Curing agent: | | | | | | |
| MOCA | 14 | | | | | 14 |
| N,N'-(2-aminoethyl) Oxydibenzylamine | | 14 | 14 | 14 | | |
| Trimethanol propane | | | | | 1.5 | |
| 1,4-butanediol | | | | | 5 | |
| Viscosity builder: | | | | | | |
| Soluble thermoplastic polyurethane | | 2 | 20 | | 2 | |
| Thermoplastic copolymer of Bisphenol A and epichlorhydrin | 5.50 | 5.5 | 4.5 | | 5 | 3 |
| Methoxy methylated nylon | | | | | | 5 |
| Curing agent for above viscosity builder: | | | | | | |
| Dianisidine diisocyanate | 0.4 | 0.4 | 0.4 | 2.0 | | |
| Diphenyl methane diisocyanate | | | | | 1 | 1 |
| Solvents: | | | | | | |
| Ethyl acetate | 6.0 | | | 6 | | 10 |
| Methyl ethyl ketone | 13.0 | 13.0 | 13.0 | 25 | 15 | |
| Methyl n propyl ketone | 3.0 | | | | 3 | |
| Mesityl oxide | | 6.0 | 6 | 5 | 5 | 5 |
| Toluene | | 3 | 3 | | | |
| Ethylene dichloride | | | | | | 50 |

THE PROCESS

The composition is helpfully pictured as containing
(1) Polyurethane precursor.
(2) Polyamine or polyol curing agent for the precursor.
(3) Viscosity builder.
(4) Diisocyanate curing agent for the viscosity builder.

The rapid curing agent (2) is not mixed with the precursor (1). However, the slower curing agent (4) may be mixed with the precursor without danger of a rapid set-up. Thus, the precursor (1) and diisocyanate (4) are mixed and supplied through one feed line. The polyamine or polyol (2) which sets up the precursor (1) almost instantaneously is supplied through a separate feed line and some of the viscosity builder (3) may be supplied through this separate feed line to make the two components of the feed streams of more nearly the same viscosity and thus more readily miscible. The application may be on to the top or the bottom of a horizontal substrate, or the substrate may be vertical or slanting. The deposit may be from .01 to 0.1 inch thick. It sets up without substantial structural change, at room temperature or a somewhat higher temperature. Heating increases the size and total volume of the voids, if heating is started before gelation is complete.

The substrate may be plastic, metal, concrete, wood, cloth, glass, etc. The spray deposit may form a coating for such articles as dunnage bags, flotation gear, bellows or any other flexible object that is simultaneously subjected to flexure, heat, ozone, abrasion, etc. The coating is readily applied to intricately shaped articles that are otherwise difficult to protect from abrasion and/or weathering. It may be used for high-strength and tear-resistant films of any suitable thickness upon already existing objects to enhance their resistance to shock, deformation, etc. No cures or only low-temperature cures are required for bonding the films to substrates. Usually no prime cement is required although the usual primers will suffice where needed.

Porosity is produced by fine bubbles which are not interconnected. Percent volume of voids may, for example, be in the range of 7 to 15 percent, or thereabouts.

The invention is further described in connection with the accompanying drawing which shows, schematically, a spray gun with its basic essential components such as: the precursor feed line, the feed line for the mixture of curing agent and viscosity builder, the drive motor, the air line for the motor, the premixer chamber and the spray nozzle. Also portrayed is a typical substrate receiving a deposit of sprayed composition. The substrate may be any one of a wide variety of materials.

What I claim is:

1. A polyurethane-precursor curing-agent-and-viscosity-builder composition which composition includes essentially hydroxyl-free organic solvent in which the following are dissolved: 4 to 15 parts of the precursor curing agent from the class consisting of polyamines and polyols, and 2 to 20 parts of viscosity builder which is capable of reacting with a diisocyanate curing agent, is compatible with said precursor curing agent and is taken from the group consisting of polymers and polymerisable materials.

2. The composition of claim 1 which includes a soluble thermoplastic polyurethane as the viscosity builder.

3. The method of building up a deposit on a substrate, which comprises spraying onto the substrate in a single pass 100 parts by weight of a polyurethane precursor of the class consisting of polyesters and polyethers, 2 to 20 parts of a viscosity builder, a diisocyanate curing agent for the viscosity builder, and 4 to 15 parts of a curing agent for the precursor from the class consisting of polyamines and polyols, and thereby forming from the foregoing a deposit which is .01 to 0.1 inch thick, and setting and curing the deposit before any substantial shifting of the deposit with respect to the substrate, said curing agent for the precursor being mixed with the precursor substantially simultaneously with the spraying thereof on to the substrate and after the diisocyanate has been mixed with the precursor.

4. The method of claim 3 in which the viscosity builder is 2 to 10 parts of thermoplastic polyurethane and 0.2 to 5 parts of an aromatic diisocyanate for curing said viscosity builder, at least some of the viscosity builder being added to the precursor with the diisocyanate.

5. The process of claim 3 in which at least some of the viscosity builder is mixed with the precursor with the diisocyanate.

References Cited

UNITED STATES PATENTS 2,606,162    8/1952    Coffey et al.

OTHER REFERENCES

Du Pont: Development Products Report 10, pp. 34, 9 (Mar. 15, 1958).

Du Pont: Development Products Report 16, p. 7 (September, 1959).

Du Pont: Adiprene Bulletin, Dec. 21, 1960.

Du Pont: Adiprene Bulletin, Aug. 15, 1960.

Du Pont: Wagd (rev.) p. 2. August 18, 1961.

Du Pont: Bulletin No. 2 (Adiprene), September 1962.

ALFRED L. LEAVITT, *Primary Examiner.*

J. H. NEWSOME, *Assistant Examiner.*

U.S. Cl. X.R.

117—161; 260—13, 16, 31.2, 32.8, 33.6, 75, 77.5, 830, 835, 849, 850, 858, 859, 873